United States Patent Office 2,766,391
Patented Oct. 9, 1956

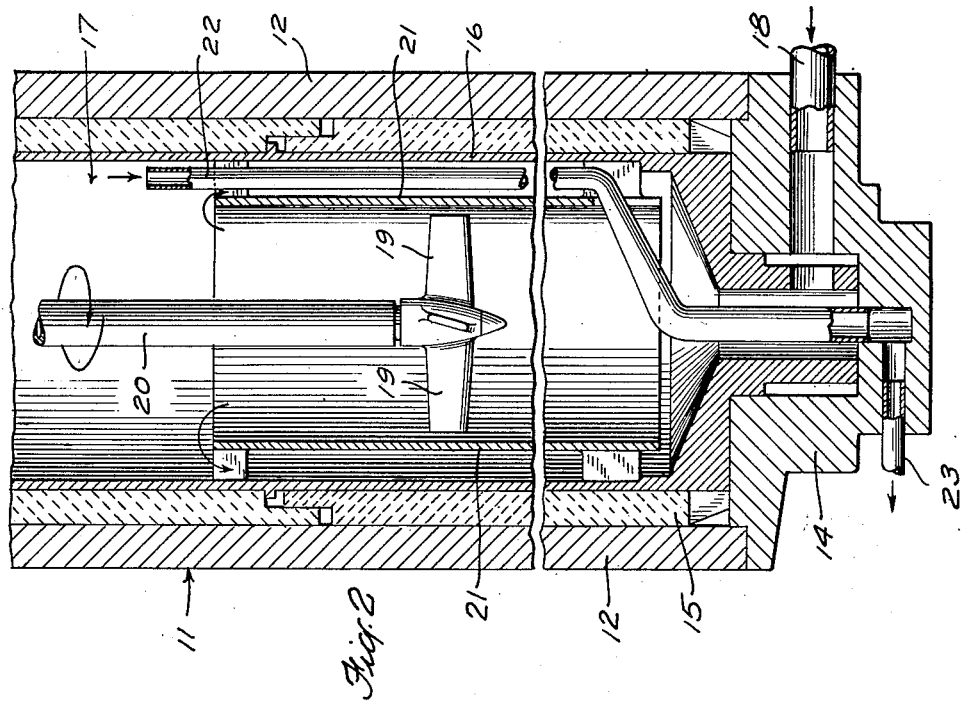

2,766,391

LIQUID COOLED ELECTRIC AGITATOR MOTOR

Paul L. Alspaugh, South Charleston, W. Va., assignor to Union Carbide and Carbon Corporation, a corporation of New York Application April 23, 1953, Serial No. 350,674

6 Claims. (Cl. 310—54)

This invention relates to an agitator for a pressure vessel. More particularly, the agitator of the invention is one suitable for the mixing and blending of materials being reacted under pressures in excess of atmospheric, for example pressures up to several thousand pounds per square inch.

A conventional agitator consists essentially of a rotating shaft which is driven by a motor and to which blades or paddles are attached. According to the prior art, the agitation of reactants in a pressure vessel is accomplished by extending the rotating shaft through the top or walls of the vessel. To maintain the pressure in the vessel a packing must be provided around the shaft. The difficulty of packing the shaft increases, of course, as the pressure in the vessel increases. Corrosive vapors if present in the vessel add to the problems of adequately packing the shaft to prevent the loss of pressure from the vessel.

The primary object of the invention is to provide an agitator for a pressure vessel which obviates the need for a shaft packing to maintain pressure in the pressure vessel.

Another object of the invention is to provide an agitator which is particularly advantageous in the agitation of reactants that are under extreme pressures in a corrosive atmosphere.

These objects are accomplished by enclosing the motor as well as the shaft and blades or paddles inside the pressure vessel. The motor is submerged in a cooling fluid, suitably oil, and subjected to substantially the same pressure that exists in the reaction section of the pressure vessel thus eliminating the need for a high pressure packing around the shaft. The motor is protected from corrosive gases and vapors, when these are present, by a splash shield and a seal, for example a liquid seal, across which the drop in pressure is on the order of a few inches of oil or water. The nature of the agitator of the invention and the manner in which the objects of the invention are accomplished will be apparent from a description of the accompanying drawing.

In the drawing:

Fig. 1 is a sectional view of the top portion of a pressure vessel equipped with an agitator built according to the invention; and Fig. 2 is a sectional view of the bottom portion of the same pressure vessel.

The pressure vessel shown in the drawing is a converter 11 in which coal is carried in a stream of oil and reacted with hydrogen in the presence of a catalyst. The converter 11 is constructed of heavy metal walls 12 to which are secured top 13 and bottom 14 closures. These are designed to withstand the great pressures encountered in the reaction. Insulation 15 minimizes the loss of heat. A lining 16, suitably of corrosion resistant steel, is provided for the reaction section 17 of the converter 11.

The reaction takes place at temperatures above about 400° C. and pressures of over 3000 pounds per square inch. Coal, oil, hydrogen and catalyst are introduced into the reaction section 17 of the converter 11 through inlet 18. These materials are mixed and agitated by the rotating blades 19 on the shaft 20 which cause the materials to flow up the center tube 21 and down the outside of that tube. The center tube 21 is open at the bottom. It will be understood that the direction of flow of the reactants can be changed without departing from the scope of the invention. For example, a reversal in the direction of rotation of the shaft 20 or a change in the pitch of the blades 19 could bring about the flow of the materials down the center tube 21 and up along the lining 16 of the converter 11 outside the center tube 21.

The material returning to the bottom of the converter mixes with fresh unreacted materials just entering the converter. The liquid products of the reaction in time overflow the take-off tube 22 and are withdrawn together with the gaseous products through outlet 23. A vent line 24 is provided for the relief of excessive pressures.

The shaft 20 to which the blades 19 are attached is rotated by an electrical motor 25. In the embodiment of the invention shown in the drawing this rotation is accomplished by attaching the shaft 20 to the rotor 26 of the motor 25. Other conventional linkages which result in the rotation of the shaft by the motor can be employed without departing from the scope of the invention.

Power is supplied to the motor 25 through leads 27 sealed to prevent the loss of pressure from the vessel. Cooling oil 28 is fed into the motor enclosure 29 through pipe 30. The cooling oil 28 leaves the enclosure 29 by traveling along the shaft 20 past the bearings 31 into the motor housing 32. This motor housing 32 is attached to or made integral with the shaft 20 so that oil leakage is eliminated. The cooling oil 28 is removed from the converter 11 through outlet pipe 33 and cooled by passing it through a conventional heat exchanger, not shown. A standpipe 34 furnishes a means of checking on the level of the cooling oil 28.

The motor 25 and motor housing 32 containing the cooling oil 28 are enclosed in a jacket 35 which is spaced from the motor housing 32 to form a chamber 36. This jacket 35 is surrounded by insulation 37 which minimizes flow of heat from the converter 11. The chamber 36 communicates through openings 38 at the top of the motor housing 32 above the level of the cooling oil with the top surface of the cooling oil 28 so that pressure in the chamber 36 and on the cooling oil 28 are the same. The bottom of the chamber 36 is open to the reaction section of the converter 17 so that the pressure on the surface of the cooling oil 28 and thus on the parts of the motor 25 is the same as that above the reactants in the converter 11.

In some instances such as the one in which coal and hydrogen are reacted, the presence of corrosive materials in the reaction section 17 makes it necessary to prevent these materials from coming into contact with the electrical motor 25 or the cooling oil 28. One solution to this problem within the scope of the invention is shown in the drawing. A splash shield 39 prevents the travel of liquids up the shaft 20 into the chamber 36. A liquid seal 40 located at the bottom of the chamber 36 prevents the flow of corrosive gases and vapors into the motor housing 32 from the reaction section 17 when the pressure in the chamber 36 equals or exceeds the pressure in the reaction section 17. The liquid seal 40 consists of a liquid 42, a receptacle 41, and a cylindrical member 43. The receptacle 41 is located at the bottom of the chamber 36 and around the shaft 20. A liquid 42, suitably a light oil, is retained in the receptacle 41. A cylindrical member 43 extends below the surface of the liquid 42 and short of the bottom of the receptacle 41 and sealingly engages the motor housing 32. With a liquid seal such as is shown in the drawing, gases must travel up the shaft 20 and depress the level of the liquid 42 below the member 43 in order to gain access to the chamber 36. A gas pressure in the reaction section 17 of the converter 11 in excess of that in the chamber 36 is required before the chamber 36 can be contaminated. To insure against any detrimental contamination, a gas, preferably hydrogen with the coal-hydrogen reaction, is introduced into the motor housing 32, suitably through a pipe 44. Excellent results have been obtained in the coal-hydrogen reaction when hydrogen is forced into the motor housing 32 to maintain a pressure in the chamber 36 of about three inches of the fluid 42 in the seal 40 in excess of the pressure in the reaction section 17. The gas which is introduced into the motor housing to maintain its pressure slightly above that of the pressure in the reaction section of the converter preferably flows into the reaction section of the converter by bubbling through the liquid in the seal.

The cooling oil in the converter shown in the drawing is withdrawn and cooled by an external heat exchanger. Cooling coils immersed in the oil in the motor housing may be employed without departing from the scope of the invention. The cooling oil is maintained at a temperature suitable for the efficient operation of the motor.

Agitation of the reactants is efficiently obtained with the agitator assembly of the invention. For example, temperatures in excess of 400° C. have been maintained for a prolonged period with variations throughout the reaction section of less than one-half of a degree and with satisfactory mechanical and electrical performance of the motor.

What is claimed is:

1. In a pressure reaction vessel the improvement in an agitator therein which comprises an electrical motor having a shaft, said motor being positioned within a motor housing, said motor housing containing a body of cooling fluid in which said motor is positioned, said shaft extending into the reaction section of said reaction vessel, said motor, said motor shaft and said motor housing being completely enclosed in said pressure vessel and said motor, said motor shaft, said motor housing and said cooling oil being subject to the pressure in said reaction section of said reaction vessel.

2. In a pressure reaction vessel the improvement in an agitator therein which comprises an electrical motor having a shaft, said motor being positioned within a motor housing, said motor housing containing a body of cooling fluid in which said motor is positioned, a chamber outside said motor housing and connecting said motor housing with the reaction section of said reaction vessel, said shaft extending into said reaction section of said pressure vessel, said motor, said motor shaft and said motor housing being completely enclosed in said pressure vessel and said motor, said motor shaft, said motor housing and said cooling oil being subject to the pressure in said reaction section of said reaction vessel.

3. In a pressure reaction vessel the improvement in an agitator which comprises an electrical motor having a shaft, said motor being positioned within a motor housing, said motor housing containing a body of cooling oil in which said motor is positioned, a chamber outside said motor housing and connecting said motor housing with the reaction section of said reaction vessel, said shaft extending into said reaction section of said pressure vessel, said motor, said motor shaft and said motor housing being completely enclosed in said pressure vessel and said motor, said motor shaft, said motor housing and said cooling oil being subject to the pressure in said reaction section of said reaction vessel, and a gas inlet opening into said chamber whereby the atmosphere in said motor housing and above said body of cooling oil can be regulated.

4. In a pressure reaction vessel the improvement in an agitator which comprises an electrical motor having a shaft, said motor being positioned within a motor housing, said motor housing containing a body of cooling oil in which said motor is positioned, a chamber outside said motor housing and connecting said motor housing with the reaction section of said reaction vessel, said shaft extending into said reaction section of said pressure vessel, a seal in said chamber to retard the flow of fluids between said chamber and said reaction section of said pressure vessel, said motor, said motor shaft and said motor housing being completely enclosed in said pressure vessel and said motor, said motor shaft, said motor housing and said cooling oil being subject to the pressure in said reaction section of said reaction vessel, and a gas inlet opening into said chamber whereby the atmosphere in said motor housing and above said body of cooling oil can be regulated.

5. In a pressure reaction vessel the improvement in an agitator which comprises an electrical motor having a shaft, said motor being positioned within a motor housing, said motor housing containing a body of cooling oil in which said motor is positioned, a chamber outside said motor housing and connecting said motor housing with the reaction section of said reaction vessel, said shaft extending into said reaction section of said pressure vessel, a seal in said chamber to retard the flow of fluids between said chamber and said reaction section of said pressure vessel, said motor, said motor shaft and said motor housing being completely enclosed in said pressure vessel and subject to the pressure in said reaction section of said reaction vessel, and a gas inlet opening into said chamber whereby the atmosphere in said motor housing and above said body of cooling oil can be regulated, said seal comprising an annular member located in said chamber and retaining a body of fluid in contact with one wall of said chamber and another annular member attached to the other wall of said chamber and extending below the surface of said retained fluid.

6. In a pressure reaction vessel the improvement in an agitator which comprises an electrical motor having a shaft, said motor being positioned within a motor housing, said motor housing containing a body of cooling oil in which said motor is positioned, a chamber outside said motor housing and connecting said motor housing with the reaction section of said reaction vessel, said shaft extending into said reaction section of said pressure vessel, a seal in said chamber to retard the flow of fluids between said chamber and said reaction section of said pressure vessel, said motor, said motor shaft and said motor housing being completely enclosed in said pressure vessel and subject to the pressure in said reaction section of said reaction vessel, and a gas inlet opening into said chamber whereby the atmosphere in said motor housing and above said body of cooling oil can be regulated, said seal comprising an annular member located in said chamber and retaining a body of fluid in contact with one wall of said chamber and another annular member attached to the other wall of said chamber and extending below the surface of said retained fluid, said reaction vessel being provided with means whereby cooling oil might be delivered to and removed from said motor.

References Cited in the file of this patent

UNITED STATES PATENTS

| Number | Name | Date |
|---|---|---|
| 1,855,274 | Arutunoff | Apr. 26, 1932 |
| 1,941,313 | Myers | Dec. 26, 1933 |
| 2,271,574 | Tucker | Feb. 3, 1942 |
| 2,377,937 | Hervert | June 12, 1945 |
| 2,598,547 | Ivanoff | May 27, 1952 |
| 2,646,001 | Ray | July 21, 1953 |